United States Patent
Larikka et al.

(10) Patent No.: US 7,203,505 B1
(45) Date of Patent: Apr. 10, 2007

(54) MESSAGE TRANSFER FROM A SOURCE DEVICE VIA A MOBILE TERMINAL DEVICE TO A THIRD DEVICE

(75) Inventors: Tapani Larikka, Vesilahti (FI); Jari Juopperi, Helsinki (FI)

(73) Assignee: Nokia Corporation, Espoo (FI)

( * ) Notice: Subject to any disclaimer, the term of this patent is extended or adjusted under 35 U.S.C. 154(b) by 843 days.

(21) Appl. No.: 09/941,851

(22) Filed: Aug. 30, 2001

(51) Int. Cl.
*H04Q 7/22* (2006.01)

(52) U.S. Cl. .................. 455/466; 715/513; 705/51; 707/10

(58) Field of Classification Search ............... 455/419, 455/418, 566, 557, 41, 414.1, 445, 466, 558; 705/51; 707/10; 715/513
See application file for complete search history.

(56) References Cited

U.S. PATENT DOCUMENTS

| | | | | |
|---|---|---|---|---|
| 5,353,328 | A * | 10/1994 | Jokimies | 455/558 |
| 6,097,961 | A * | 8/2000 | Alanara et al. | 455/466 |
| 6,275,575 | B1 | 8/2001 | Wu | |
| 6,301,471 | B1 | 10/2001 | Dahm et al. | |
| 6,501,956 | B1 | 12/2002 | Weeren et al. | |
| 6,560,456 | B1 * | 5/2003 | Lohtia et al. | 455/445 |
| 6,633,759 | B1 * | 10/2003 | Kobayashi | 455/419 |
| 2002/0087596 | A1 * | 7/2002 | Lewontin | 707/513 |
| 2002/0123307 | A1 * | 9/2002 | Winarski | 455/41 |
| 2002/0161769 | A1 * | 10/2002 | Sutinen et al. | 707/10 |
| 2003/0078890 | A1 * | 4/2003 | Schmidt et al. | 705/51 |
| 2004/0048603 | A1 * | 3/2004 | Corneliussen et al. | 455/414.1 |

FOREIGN PATENT DOCUMENTS

| | | |
|---|---|---|
| EP | 1039768 | 9/2000 |
| WO | WO9847270 | 10/1998 |
| WO | WO9857507 | 12/1998 |
| WO | WO9961984 | 12/1999 |
| WO | WO0057339 | 9/2000 |

OTHER PUBLICATIONS

Supplementary European Search Report (02770138.2 dated Mar. 27, 2006).
SyncML Sync Protocol, version 1.0, Dec. 7, 2000, pp. 1-60.
SyncML Representation Protocol, version 1.0, Dec. 7, 2000, pp. 1-104.

* cited by examiner

*Primary Examiner*—Gerald Gauthier
(74) *Attorney, Agent, or Firm*—Banner & Witcoff, Ltd.

(57) ABSTRACT

A technique for transferring a data message between a first terminal device and a second terminal device via an intermediate terminal device includes: entering a data message into the first terminal device; transmitting the data message from the first terminal device to the intermediate terminal device; formatting the data message into at least one SMS (Short Message Service) message in the intermediate terminal device; and transmitting the at least one SMS message from the intermediate terminal device to the second terminal device. Formatting the data message may include formatting the data in a SyncML format. The intermediate terminal device may include a mobile terminal and the data message may be transferred from the first terminal device to the intermediate terminal device via a short range communication link which may include an IR or Bluetooth communication link.

45 Claims, 3 Drawing Sheets

SyncML message is inserted into SMS message

MESSAGE TRANSFER FROM A SOURCE DEVICE VIA A MOBILE TERMINAL DEVICE TO A THIRD DEVICE

BACKGROUND OF THE INVENTION

1. Field of the Invention

The present invention relates to transferring messages between devices. More particularly, the present invention relates to transferring SyncML (Synchronization Markup Language) messages from a source device via a mobile terminal device to a third device.

2. Description of the Related Art

Data synchronization between terminal devices is an issue in which each vendor has traditionally had their own proprietary solution. Each vendor developed their own synchronization protocol as well as internal data representations for each application. Due to the proprietary nature of such systems, the products of different vendors have been unable to communicate with each other without specially designed single purpose converters.

These non-interoperable solutions have complicated the tasks of users, manufacturers, service providers, and developers. Furthermore, the proliferation of different proprietary data synchronization protocols have placed barriers to the extended use of mobile terminals and has restricted data access and delivery and limited the mobility of the users.

In view of the above, several mobile terminal manufacturers joined together into an organization to create a new industry initiative to develop and promote a single, common, data synchronization protocol, namely, SyncML, that can be used everywhere, by every device or terminal and in every application.

SyncML is a common language which has been developed for synchronizing devices and applications over any network. SyncML leverages XML (Extensible Markup Language), that is, a SyncML message is an XML document, and with SyncML, network information can be synchronized with any mobile device or terminal and mobile information can be synchronized with any networked application or applications. With SyncML, any personal information, such as e-mail, calendars, to-do lists, contact information and other relevant data, etc., will be consistent, accessible, and up-to-date, no matter where the information is stored. For example, a calendar entry made to a mobile device or terminal on a business trip is equally available to a secretary in the network calendar.

At present, the SyncML standard contains three different transport alternatives for sending SyncML messages. These alternatives are HTTP (Hyper-Text Transfer Protocol), WSP (Web System Protocol), and OBEX (Object Exchange Protocol).

While each of these alternatives are usable, they all have the same defect, namely, all of these alternatives require the use of a continuous data connection between the mobile device or terminal and the network.

Furthermore, there are personal portable server devices presently available which only have short range connection capabilities, such as IR (Infrared) or Bluetooth. Accordingly, at present, they are unable to synchronize data with remotely located terminals which are out of their limited communication range.

SUMMARY OF THE INVENTION

Modern-day mobile terminals, such as mobile telephones, have been provided with the SMS (Short Message Service) capability. SMS allows a single short message of up to one hundred sixty characters of text in length to be sent from a sender to a recipient. However, rather than requiring a continuous data connection, the SMS is a store and forward service, that is, short messages are not sent directly from sender to recipient but rather are sent via an intermediary SMS center instead. Each mobile telephone network that supports SMS, for example, has one or more SMS messaging centers to handle and manage SMS messages. Many such modern-day mobile terminals include IR or Bluetooth capability which allows them to communicate with the aforementioned personal portable servers.

Accordingly, it is an object of the present invention to utilize the short range communication capability of a mobile device or terminal device as a transport mechanism to forward SyncML messages from a source device or terminal device to another terminal device.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same as by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
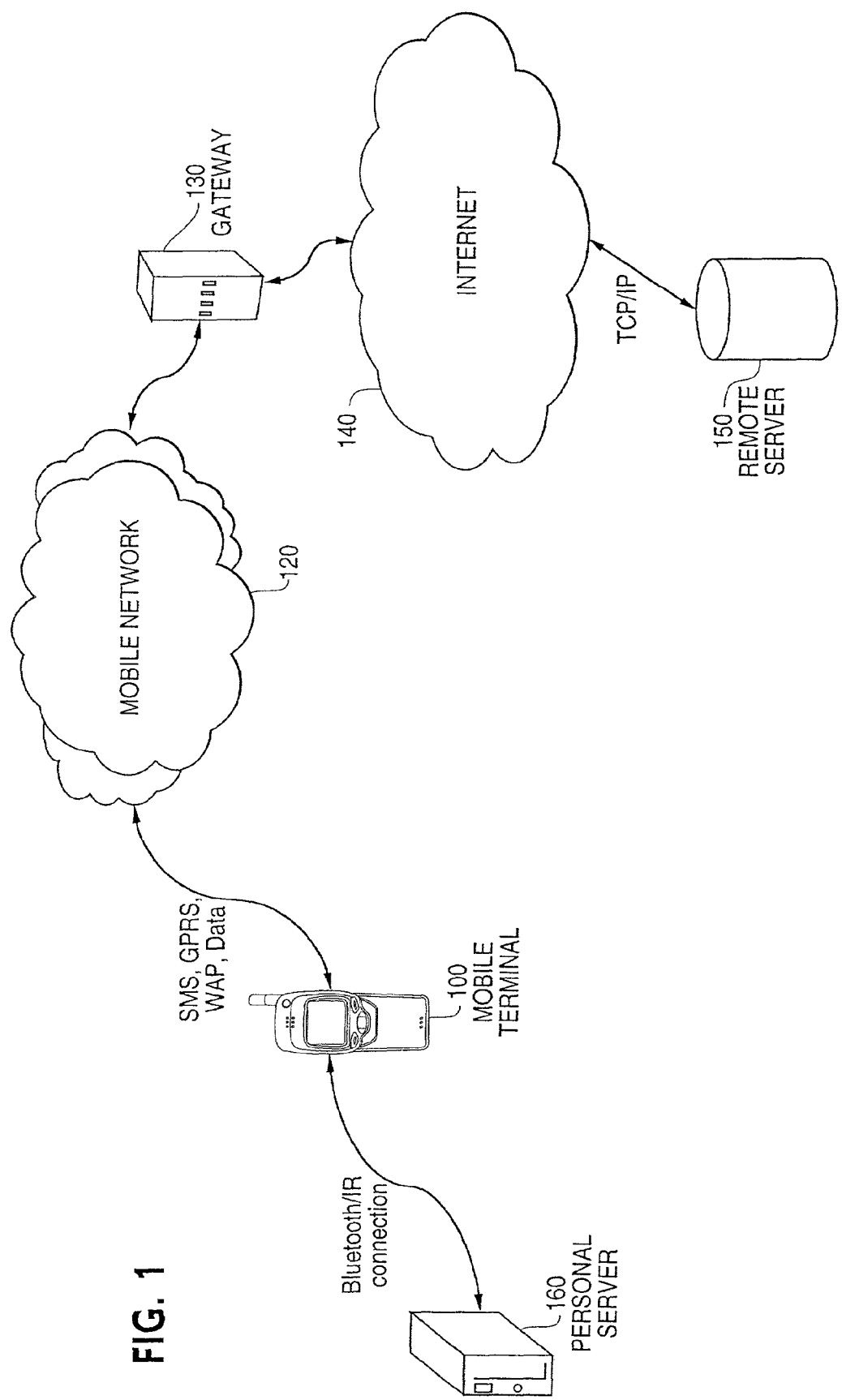
FIG. 1 is a block diagram illustrating an example of a system to which the present invention may be applied.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/model/values/ranges may be given, although the present invention is not limited thereto. Where specific details are set forth in order to describe example embodiments of the invention, it should be apparent to one skilled in the art that the invention can be practiced without, or with variations of, these specific details. Finally, it should be apparent that differing combinations of hard-wired circuitry and software instructions can be used to implement embodiments of the present invention, that is, the present invention is not limited to any specific combination of hardware and software.

FIG. 1 is a block diagram illustrating an example of a system to which the present invention can be applied. As illustrated in FIG. 1, a mobile terminal 100, such as a cell phone, is connected to a mobile network 120 such that data in various formats, e.g.-SMS, GPRS, WAP, may be transmitted therebetween. The mobile network 120 is connected to a gateway 130 which is in turn connected via the Internet 140 to a remote server 150. Accordingly, the mobile terminal 100 may communicate with the remote server 150 bidirectionally via the mobile network 120, gateway 130, and Internet 140. A personal server 160, for example, is connected to the mobile terminal 100 via a short range connection such as Bluetooth or IR.

Thus, the mobile terminal 100 in effect operates as a modem for the personal server 160 so so as to allow the personal server 160 to forward messages, such as data to be synchronized, to the remote server 150 via the mobile network 120 and gateway 130 and Internet 140.

As mentioned previously, the widespread use of mobile terminal devices has increased demand for a technique for synchronizing such mobile terminal devices with both other mobile terminal devices and fixed terminal devices. For example, a salesman who is away from his office may wish to update his calendar and business contacts address book on his mobile terminal device and to then update, that is, synchronize, his calendar and business contacts address book on his office computer. He may also wish to synchronize his calendar on his office network so that his secretary and his supervisor can be aware of his schedule.

As also mentioned previously, modern-day mobile terminals are now being provided with SMS capability. SMS allows a sender to send a short message to a recipient via an SMS center. To use the SMS service a user needs a subscription to a mobile telephone network that supports SMS. In addition, the use of SMS must been enabled for that user, for example, automatic access to the SMS is provided by some mobile network operators while others charge a monthly subscription to use the service. The user would require a mobile terminal that supports SMS and a knowledge of how to send or receive an SMS message on that mobile terminal. Lastly, the user must know a destination to send the SMS message to or to receive the SMS message from. The destination may be another mobile terminal or a PC or an Internet address.

As noted above, the SyncML standard presently contains three different transport alternatives for sending SyncML messages, namely, HTTP, WSP, and OBEX. All these alternatives require the use of a continuous data connection between the mobile terminal and the telephone network.

Figure 2:
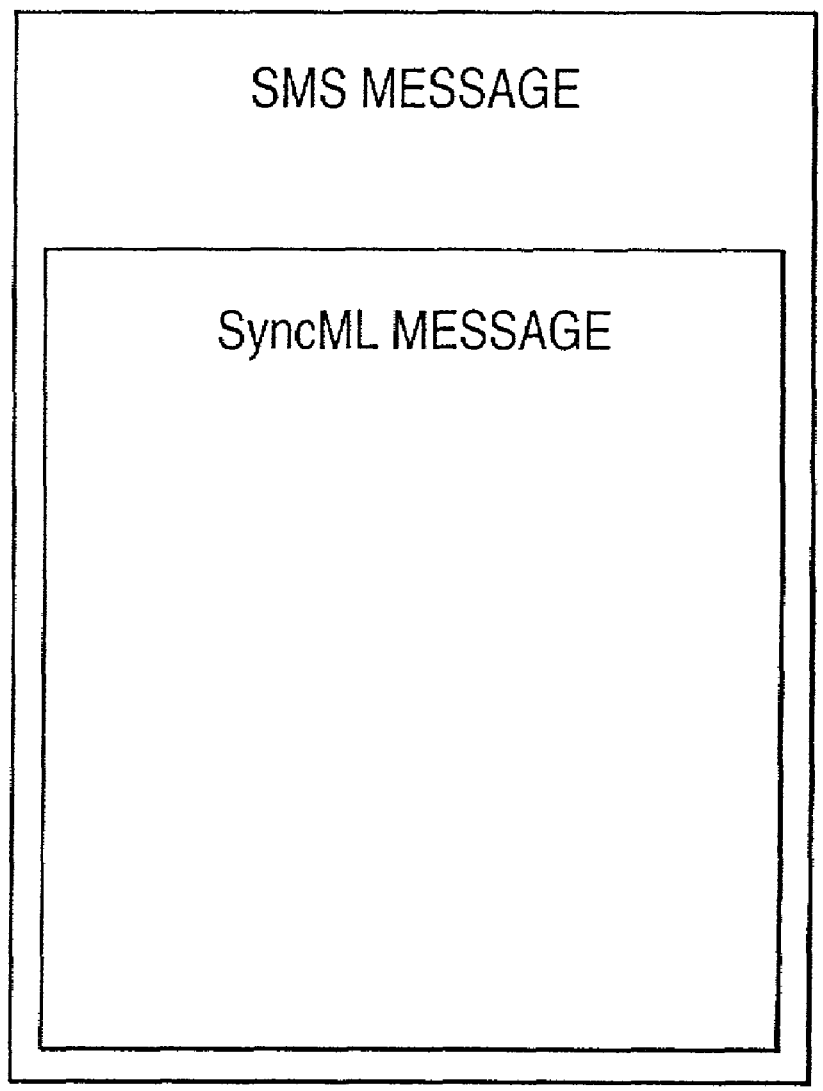
FIG. 2 illustrates a SyncML message being inserted into an SMS message in accordance with an example embodiment of the present invention.

On the other hand, in the present invention, it is proposed that a fourth transport alternative to be provided for sending SyncML messages namely, the SMS network. As shown in FIG. 2, it is proposed that the SyncML message of a user be inserted into an SMS message and sent to a recipient via the SMS network. Since modern-day mobile terminals already include SMS capability and since SMS centers are already in place and operating, no new technology or equipment is needed to send SyncML messages via the SMS network.

Furthermore, since SMS is a store and forward service, short messages are not sent directly from the sender to the recipient via a continuous data connection but rather are sent via an SMS center instead. This increases the reliability and reduces the operating costs.

The only disadvantage of using SMS is that a single SyncML message is limited to one hundred and sixty characters. However, the use of WBXML (Wireless Application Protocol Binary Extensible Markup Language) encoding allows for a compact binary representation of XML (Extensible Markup Language), allowing more effective use of XML data on narrowband communication channels, thereby allowing a SyncML message to possibly be reduced in size so as to fit within the size limitation of the SMS message. Furthermore, other data compression techniques could also be used to reduce the size of a SyncML message.

Figure 3:
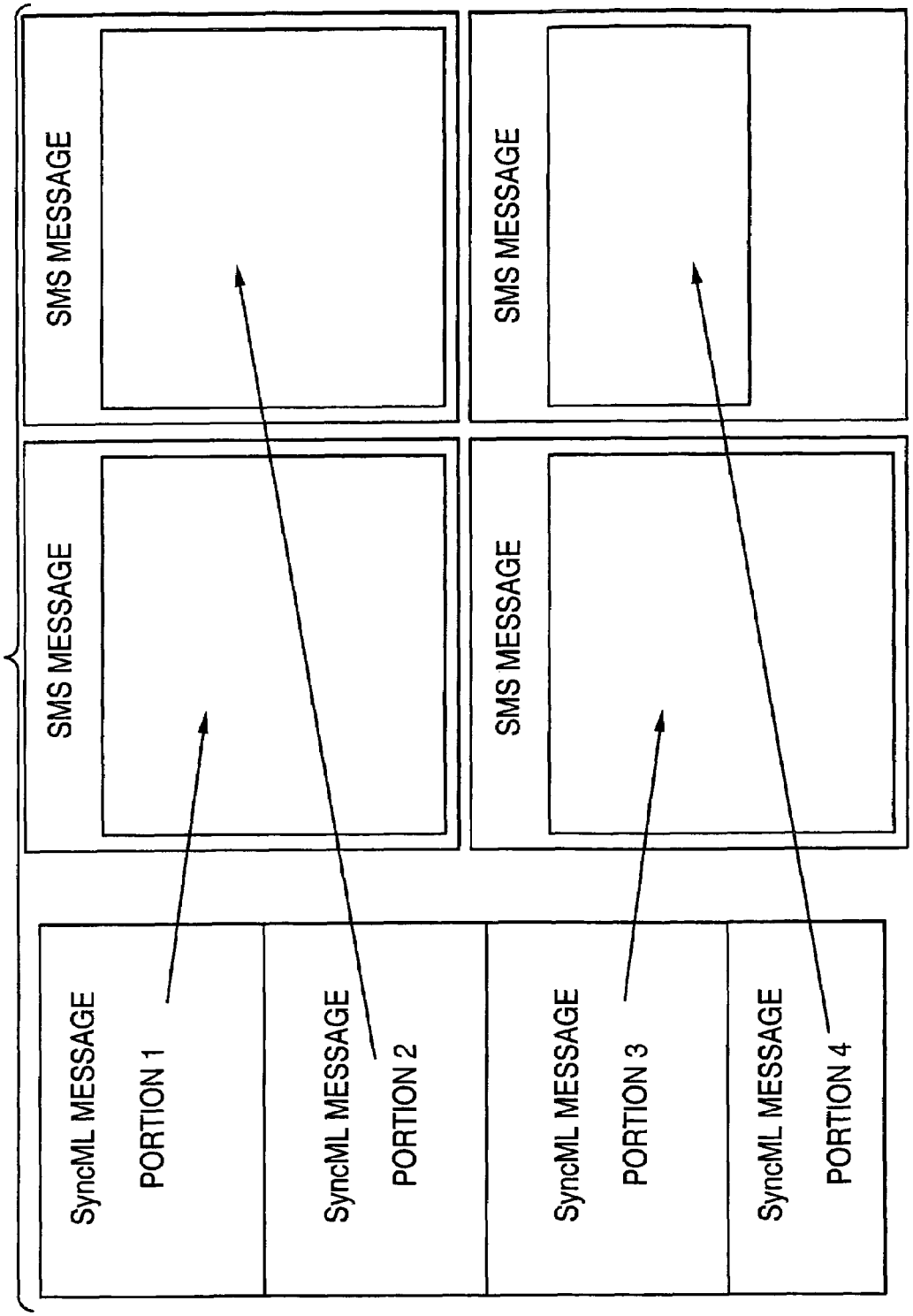
FIG. 3 illustrates a SyncML message being split up and inserted into a plurality of SMS messages in accordance with an example embodiment of the present invention.

Furthermore, should it be impossible to limit the SyncML message to one hundred and sixty characters, as illustrated in FIG. 3, it is possible to split a SyncML message into two or more portions and transmit the SyncML message using two or more SMS messages. It is noted that SMS standards provide for sending multiple short messages which are to be combined by the recipient.

It is also to be noted that the SyncML standard includes two different mandatory MIME (Multipurpose Internet Mail Extensions) types, namely, vcal, a format for synchronizing calendars and vcard, a format for synchronizing business cards (that is, a business contact address book). This allows for further standardization between terminals of different manufacturers. Other MIME types are presently not supported nor requested, thus basically reducing the use of SyncML for only these two MIME types. More information about MIME can be found in RFC2045–RFC2049. These RFCs may be found on the Web site: www.nacs.uci.edu/indiv/ehood/MIME/MIME.html, among others.

As noted above, provision is made for sending SyncML messages in excess of the one hundred and sixty character limitation of single SMS messages. This may be automatically provided for by the SMS programming in the mobile terminal. Alternatively, the SyncML message may be transmitted by one of the other three available transport alternatives, namely, HTTP, WSP, and OBEX, or any other available transport alternative.

This concludes the description of the example embodiments. Although the present invention has been described with reference to a number of illustrative embodiments thereof, should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

Furthermore, the specific details of the SMS protocol, SyncML protocol, WBXML, and MIME protocol have not been included in the present specification for the sake of brevity. It is understood that these industrywide protocols are readily available and the details thereof are incorporated by reference herein in their entirety.

What is claimed is:

1. A method for data synchronization between a first terminal device and a second, remotely located, terminal device via an intermediate terminal device, the method comprising:
   obtaining, at the first terminal device, data to be synchronized with the second remotely located terminal device;
   transmitting the data from the first terminal device to the intermediate terminal device through a short-range connection;
   formatting the data to be synchronized into at least one SMS (Short Message Service) message in the intermediate terminal device; and transmitting the at least one SMS message from the intermediate terminal device to the second remote located terminal device through cellular network connection.

2. The method of claim 1, wherein formatting the data message comprises formatting the data in a SyncML format.

3. The method of claim 1, wherein the intermediate terminal device comprises a mobile terminal device.

4. The method of claim 3, wherein the at least one SMS message is transmitted via a mobile network including an SMS message center.

5. The method of claim 4, wherein the at least one SMS message is transmitted from the intermediate terminal device to the second, remotely located, terminal device via the mobile network and a gateway and the Internet.

6. The method of claim 1, wherein the at least one SMS message comprises a compressed SMS message.

7. The method of claim 6, wherein the compressed SMS message comprises a WBXML (Wireless Application Protocol Binary Extensible Markup Language) encoded message.

8. The method of claim 2, wherein the data formatted in a SyncML format comprises one of two MIME (Multipurpose Internet Mail Extensions) formats.

9. The method of claim 8, wherein the two MIME formats comprise vcal and vcard formats.

10. The method of claim 1, wherein the data message comprises one of a calendar, a to-do list, personal information, and contact information.

11. The method of claim 1, wherein the data message is transferred from the first terminal device to the intermediate terminal device via a short range communication link.

12. The method of claim 11, wherein the short range communication link comprises one of an IR (Infrared) or Bluetooth communication link.

13. The method of claim 1, further comprising transmitting at least one other SMS message from the second terminal device to the first terminal device via the intermediate terminal device.

14. A mobile terminal device comprising:
a data message receiver to receive data from a first terminal device, which data is to be synchronized with a second, remotely located, terminal device via a short range communication link;
a formatter to format the received data into at least one SMS (Short Message Service) message; and
a transmitter to transmit the at least one SMS message to the second, remotely located, terminal device through a cellular network connection.

15. The device of claim 14, wherein the formatter formats the data in a SyncML format.

16. The device of claim 14, wherein the at least one SMS message formatted by the formatter comprises a compressed SMS message.

17. The device of claim 16, wherein the compressed SMS message formatted by the formatter comprises a WBXML (Wireless Application Protocol Binary Extensible Markup Language) encoded message.

18. The device of claim 14, wherein the data formatted by the formatter in a SyncML format comprises one of two MIME (Multipurpose Internet Mail Extensions) formats.

19. The device of claim 18, wherein the two MIME formats formatted by the formatter comprise vcal and vcard.

20. The device of claim 14, wherein the data comprises one of a calendar, a to-do list, a personal information, and contact information.

21. The device of claim 14, wherein the data receiver receives data messages via one of an IR (Infrared) or Bluetooth communication link.

22. The method of claim 14, further comprising a receiver to receive at least one other SMS message from the another terminal device and a data message transmitter to transmit the at least one other SMS message to the first terminal device.

23. A program storage device, readable by machine, tangibly embodying a program of instructions executable by machine to perform a method of synchronization between a first terminal device and a second, remotely located, terminal device via an intermediate terminal device, the method comprising:
obtaining, at the first terminal device, data to be synchronized with the second remote located terminal device;
transmitting the data from the first terminal device to the intermediate terminal device through a short-range connection;
formatting the data to be synchronized into at least one SMS (Short Message Service) message in the intermediate terminal device; and
transmitting the at least one SMS message from the intermediate terminal device to the second remote located terminal device through a cellular network connection.

24. The device of claim 23, wherein formatting the data message comprises formatting the data in a SyncML format.

25. The device of claim 23, wherein the intermediate terminal device comprises a mobile terminal device.

26. The device of claim 25, wherein the at least one SMS message is transmitted via a mobile network including an SMS message center.

27. The device of claim 26, wherein the at least one SMS message is transmitted from the intermediate terminal device to the second remotely located terminal device via the mobile network and a gateway and the Internet.

28. The device of claim 23, wherein the at least one SMS message comprises a compressed SMS message.

29. The device of claim 28, wherein the compressed SMS message comprises a WBXML (Wireless Application Protocol Binary Extensible Markup Language) encoded message.

30. The device of claim 24, wherein the data formatted in a SyncML format comprises one of two MIME (Multipurpose Internet Mail Extensions) format.

31. The device of claim 30, wherein the two MIME formats comprise vcal and vcard formats.

32. The device of claim 23, wherein the data message comprises one of a calendar, a to-do list, personal information, and contact information.

33. The device of claim 23, wherein the data message is transferred from the first terminal device to the intermediate terminal device via a short range communication link.

34. The device of claim 33, wherein the short range communication link comprises one of an IR (Infrared) or Bluetooth communication link.

35. The device of claim 23, further comprising transmitting at least one other SMS message from the second terminal device to the first terminal device via the intermediate terminal device.

36. A method of data synchronization between a first terminal device and a, remote located, second terminal device via an intermediate terminal device, the method comprising:
obtaining, at the first terminal device, data to be synchronized with the second remotely located terminal device;

transmitting the data from the first terminal device to the intermediate terminal device through a short-range connection;

formatting the data into at least one SMS (Short Message Service) message in the intermediate terminal device;

transmitting the least one SMS message from the intermediate terminal device to a message center; and transmitting the at least one message from the message center to the second remote located terminal device through a cellular network connection.

37. The method of claim 36, wherein the message center comprises an SMS message center.

38. The method of claim 36, wherein the data is transmitted from the first terminal device to the intermediate terminal device via a short range communication link.

39. The method of claim 38, wherein the short range communication link comprises one of either an IR (Infrared) or Bluetooth communication link.

40. The method of claim 31, further comprising transmitting other data from the second terminal device to the first terminal device via the intermediate terminal device.

41. A program storage device, readable by machine, tangibly embodying a program of instructions executable by machine to perform a method of data synchronization between first and second remote locate terminal devices via an intermediate terminal device, the method comprising:

obtaining, at the first terminal device, data to be synchronized with the second remotely located terminal device;

transmitting the data from the first terminal device to the intermediate terminal device through short-range connection;

formatting the data into at least one SMS (Short Message Service) message in the intermediate terminal device;

transmitting the least one message from the intermediate terminal device to a message center; and transmitting the at least one message from the message center to the second remotely located terminal device through a cellular or network connection.

42. The device of claim 41, wherein the message center comprises an SMS message center.

43. The device of claim 41, wherein the data is transmitted from the first terminal device to the intermediate terminal device via a short range communication link.

44. The device of claim 43, wherein the short range communication link comprises one of either an IR (Infrared) or Bluetooth communication link.

45. The device of claim 41, further comprising transmitting other data from the second terminal device to the first terminal device via the intermediate terminal device.

* * * * *

UNITED STATES PATENT AND TRADEMARK OFFICE
CERTIFICATE OF CORRECTION

| | | |
|---|---|---|
| PATENT NO. | : 7,203,505 B1 | Page 1 of 1 |
| APPLICATION NO. | : 09/941851 | |
| DATED | : April 10, 2007 | |
| INVENTOR(S) | : Tapani Larikka et al. | |

It is certified that error appears in the above-identified patent and that said Letters Patent is hereby corrected as shown below:

In Claim 40, Column 7, Line 19:
    Please delete "Claim 31" and insert --Claim 36--

Signed and Sealed this

Twenty-third Day of October, 2007

JON W. DUDAS
*Director of the United States Patent and Trademark Office*